UNITED STATES PATENT OFFICE.

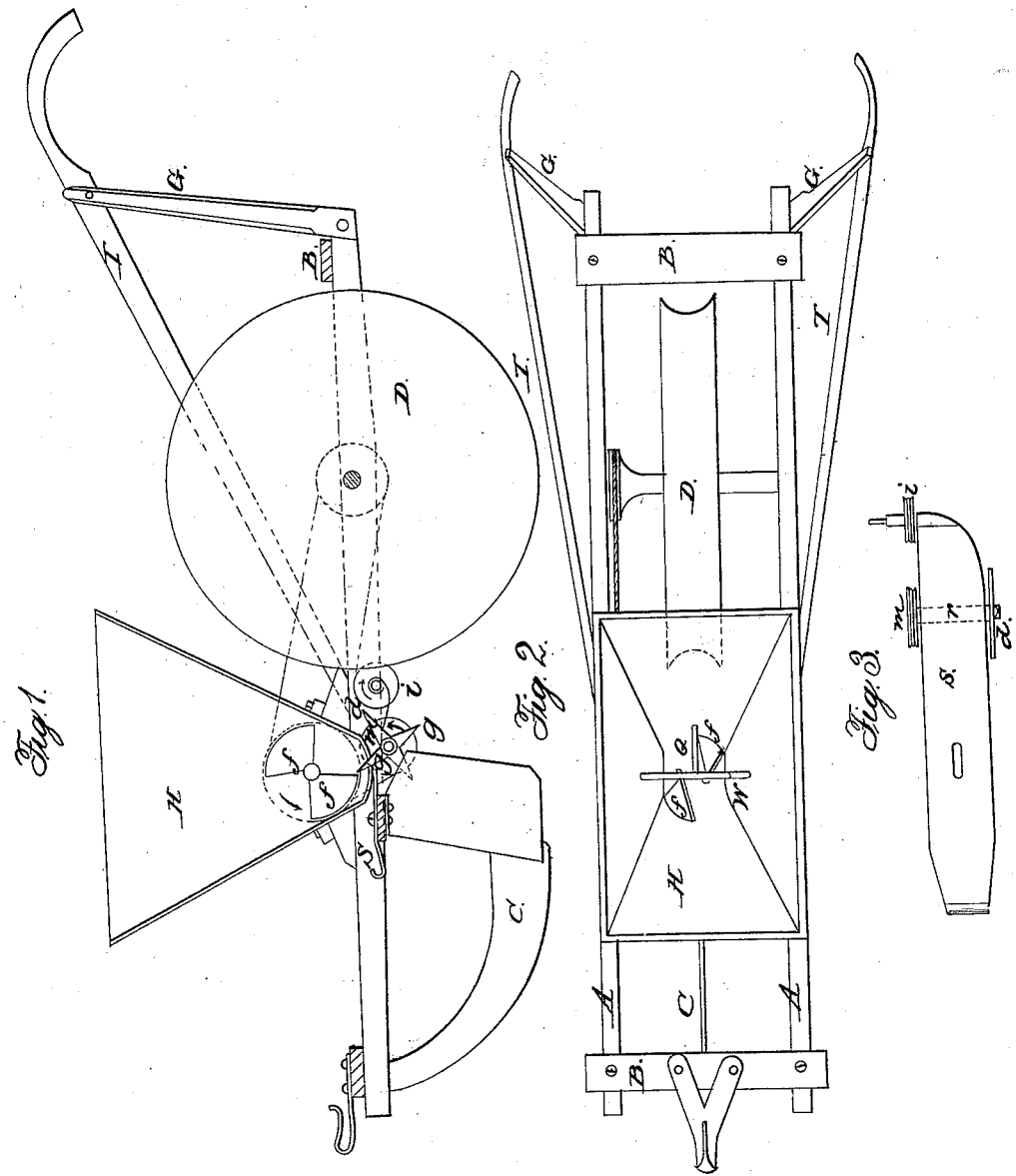

I. W. McGAFFEY, OF CHICAGO, ILLINOIS.

IMPROVEMENT IN MACHINES FOR PLANTING COTTON-SEED.

Specification forming part of Letters Patent No. 56,430, dated July 17, 1866.

*To all whom it may concern:*

Be it known that I, IVES W. McGAFFEY, of the city of Chicago, in the county of Cook and State of Illinois, have invented new and useful Improvements in a Machine for Planting Cotton-Seed; and I do hereby declare that the following is a full and exact description thereof, reference being had to the accompanying drawings, and to the letters of reference marked thereon, in which—

Figure 1 is a longitudinal side view with a portion of the seed-box and frame-work removed. Fig. 2 is a plain top view. Fig. 3 is a top view of the adjustable slide to which the fingers are attached.

The frame-work consists of two side pieces extending longitudinally from front to rear and fastened in position by cross-pieces. To the under side of the frame-work, in front, is fastened a shoe or runner, C, with an opening or seed-tube at its rear end for opening a furrow wherein to drop the seed. A wheel or roller, D, is fixed into the frame-work in the rear of the runner for the purpose of covering the seed and giving motion to the seeding device, which is communicated by a belt and pulleys or an endless chain with suitable gears, as are in common use for various purposes. A hopper or seed-box, H, is mounted on the frame-work over the rear end of the runner C. A shaft, W, passes through the seed-box, and is connected with the driving-wheel D by a belt and pulley, so as to revolve when the machine is in operation. To this shaft W flanges $f f$ are attached, which are shaped similar to the blades of a propeller-wheel and operate upon the same principle, for the purpose of agitating the seed so as to prevent its packing and clogging, and conveying it from the sides to the center of the seed-box, where an opening, Q, is made through the bottom of the seed-box, through which the seed is discharged.

Under the seed-box is a shaft, W, and driving-pulley $m$. Upon that shaft rotating fingers $g$ are fixed and so arranged as to work into the opening or slot Q in the bottom of the seed-box and pull out the seed and throw it to the ground, the cotton-seed being so clinging in its nature that it will not separate and fall through by its own gravity.

The fingers $g g$ and shaft are fixed in a movable slide, S, which allows the fingers to be adjusted farther into or out of the seed-box, for the purpose of distributing more or less seed.

The fingers $g$ are fastened on the shaft by means of a nut, so they can be easily detached and more or less fingers substituted for further regulating or controlling the quantity of seed discharged.

A small pulley, $i$, is fixed on the adjustable slide for the purpose of giving more tension to the belt upon pulley $m$.

A pair of handles, T, supported by braces G, are fixed to the rear part of the frame-work, by which the operator may handle and control the machine.

What I claim as my invention, and desire to secure by Letters Patent, is—

1. The rotating flanges in the seed-box for moving and agitating the seed, constructed and arranged in the manner and for the purpose specified.

2. The rotating fingers, in combination with the flanges or agitators in the seed-box, arranged and operated as shown.

3. The construction, arrangement, and combination of the fingers and adjustable slide for regulating the quantity of seed discharged, substantially as specified.

IVES W. McGAFFEY.

Witnesses:
EDWARD P. TOWNE,
HORACE F. WAITE.